US011481776B2

(12) United States Patent
Kankaria et al.

(10) Patent No.: US 11,481,776 B2
(45) Date of Patent: Oct. 25, 2022

(54) SYSTEM, METHOD, AND APPARATUS FOR PROCESSING BIOMETRIC INPUTS

(71) Applicant: Visa International Service Association, San Francisco, CA (US)

(72) Inventors: Ashish Vinod Kankaria, Nashik (IN); Sunny Raj Rathod, Pune (IN); Naman Bansal, Bellevue, WA (US); Kaushik Kumar Mahato, Jamshedpur (IN); Akash Shah, Kolkata (IN)

(73) Assignee: Visa International Service Association, San Francisco, CA (US)

( * ) Notice: Subject to any disclaimer, the term of this patent is extended or adjusted under 35 U.S.C. 154(b) by 9 days.

(21) Appl. No.: 16/627,124

(22) PCT Filed: Jun. 28, 2017

(86) PCT No.: PCT/US2017/039642
§ 371 (c)(1),
(2) Date: Dec. 27, 2019

(87) PCT Pub. No.: WO2019/005025
PCT Pub. Date: Jan. 3, 2019

(65) Prior Publication Data
US 2020/0184481 A1 Jun. 11, 2020

(51) Int. Cl.
*G06Q 20/40* (2012.01)
*G06Q 20/20* (2012.01)
(Continued)

(52) U.S. Cl.
CPC ....... *G06Q 20/40145* (2013.01); *G06Q 20/20* (2013.01); *G06Q 20/227* (2013.01); *G06Q 20/322* (2013.01); *G06V 40/13* (2022.01)

(58) Field of Classification Search
CPC .................................................. G06Q 20/40145
(Continued)

(56) References Cited

U.S. PATENT DOCUMENTS

2006/0043169 A1  3/2006  Haertel
2007/0284432 A1  12/2007  Abouyounes
(Continued)

FOREIGN PATENT DOCUMENTS

WO    2017063546 A1    4/2017

OTHER PUBLICATIONS

H. Vats, R. Ruhl and S. Aghili, "Fingerprint security for protecting EMV payment cards," 2015 10th International Conference for Internet Technology and Secured Transactions (ICITST), 2015, pp. 95-101, doi: 10.1109/ICITST.2015.7412065. (Year: 2015).*

*Primary Examiner* — Eric T Wong
*Assistant Examiner* — Kevin T Poe
(74) *Attorney, Agent, or Firm* — The Webb Law Firm

(57) ABSTRACT

Provided is a point-of-sale system for processing biometric inputs, comprising a fingerprint reader configured to receive a plurality of fingerprints simultaneously or substantially simultaneously, an input device configured to receive transaction data, a communication device, and at least one processor in communication with the fingerprint reader, the input device, and the communication device. The at least one processor is programmed or configured to generate at least one transaction message for a transaction based at least partially on a plurality of account identifiers corresponding to the plurality of fingerprints received by the fingerprint reader and the transaction data received by the input device, the at least one transaction message comprising an apportionment of the transaction value among the plurality of account identifiers, and communicate, with the communication device, the at least one transaction message to a transaction processing server. A system and method for processing biometric inputs are also disclosed.

20 Claims, 5 Drawing Sheets

(51) Int. Cl.
*G06Q 20/22* (2012.01)
*G06Q 20/32* (2012.01)
*G06V 40/13* (2022.01)

(58) Field of Classification Search
USPC .......................................................... 705/44
See application file for complete search history.

(56) References Cited

U.S. PATENT DOCUMENTS

| | | |
|---|---|---|
| 2009/0138366 A1 | 5/2009 | Bemmel et al. |
| 2009/0150286 A1* | 6/2009 | Barton .................. G06Q 20/40 705/44 |
| 2011/0191250 A1 | 8/2011 | Bishop et al. |
| 2015/0046328 A1* | 2/2015 | Mitra ............... G06Q 20/40145 705/44 |
| 2015/0088755 A1 | 3/2015 | Sobel et al. |
| 2015/0149310 A1* | 5/2015 | He ......................... G06Q 20/32 705/21 |
| 2015/0278495 A1 | 10/2015 | Yu et al. |
| 2015/0317638 A1* | 11/2015 | Donaldson ....... G06Q 20/40145 705/44 |
| 2016/0027079 A1* | 1/2016 | Schoeffler .......... G06Q 30/0609 705/325 |
| 2016/0086187 A1* | 3/2016 | Joao ................ G06Q 20/40145 705/44 |
| 2016/0328717 A1 | 11/2016 | Shaw et al. |
| 2016/0328802 A1* | 11/2016 | Howe .................... G06Q 40/12 |
| 2020/0320643 A1* | 10/2020 | Nathoo ................ G06Q 40/125 |

* cited by examiner

SYSTEM, METHOD, AND APPARATUS FOR PROCESSING BIOMETRIC INPUTS

CROSS REFERENCE TO RELATED APPLICATION

This application is the United States national phase of International Application No. PCT/US2017/039642 filed Jun. 28, 2017, the disclosure of which is hereby incorporated by reference in its entirety.

BACKGROUND

1. Technical Field

This disclosure relates generally to biometric systems and, in some non-limiting embodiments or aspects, to a system, method, and apparatus for processing biometric inputs.

2. Technical Considerations

Existing biometric systems enable users to authenticate themselves using a biometric input, such as a fingerprint. When biometric systems are used for authenticating transactions, a user may choose a method of payment and then provide a biometric input to authenticate the transaction. The user of such systems must still carry his or her portable financial device, such as a credit card or electronic wallet, for initiating the transaction. Further, existing biometric systems that accept fingerprint inputs only allow for a single fingerprint to be scanned at once.

Individuals often have numerous transaction accounts for making purchases, such as several credit cards specific to different issuer institutions and/or merchants. Different transaction accounts may be associated with different rewards, depending on when, where, and how the transaction account is utilized. To avail themselves of these options, users typically have to carry and manage portable financial devices for each transaction account. Carrying numerous credit cards, for example, increases the likelihood that the cards may be lost, stolen, and/or compromised. Moreover, users have no way of knowing, without conducting research, what rewards are available for each transaction account, the spending limits and/or balances of each transaction account, and/or various other limitations and/or benefits that may be specific to each account.

Moreover, it is increasingly common for multiple users to "split" transactions between multiple transaction accounts. In such scenarios, each user typically hands a physical payment device, such as a credit or debit card, to a merchant agent to divide the transaction value by the number of individuals, and generate individual invoices for each user and each transaction account. This requires the users to relinquish their cards while the merchant is dividing the invoice, which allows for the possibility of fraud, and for each user to be in possession of their respective portable financial devices.

SUMMARY

Accordingly, provided are improved systems, methods, and apparatuses for processing biometric inputs that overcomes some or all of the deficiencies of the prior art.

According to some non-limiting embodiments or aspects, provided is a point-of-sale system for processing biometric inputs, comprising: (a) a fingerprint reader configured to receive a plurality of fingerprints simultaneously or substantially simultaneously; (b) an input device configured to receive transaction data, the transaction data comprising a transaction value; (c) a communication device; and (d) at least one processor in communication with the fingerprint reader, the input device, and the communication device, the at least one processor programmed or configured to: (i) generate at least one transaction message for a transaction based at least partially on a plurality of account identifiers corresponding to the plurality of fingerprints received by the fingerprint reader and the transaction data received by the input device, the at least one transaction message comprising an apportionment of the transaction value among the plurality of account identifiers; and (ii) communicate, with the communication device, the at least one transaction message to a transaction processing server.

In some non-limiting embodiments or aspects, the fingerprint reader comprises at least one of the following: an optical fingerprint reader, a capacitive fingerprint reader, an ultrasound fingerprint reader, a thermal fingerprint reader, or any combination thereof. In some non-limiting embodiments or aspects, the at least one processor may be further programmed or configured to: (iii) determine at least one account identifier of a plurality of account identifiers assigned to the at least one fingerprint; and (iv) process the transaction message based at least partially on the at least one account identifier and the transaction data. In some non-limiting embodiments or aspects, the at least one processor may comprises a local processor and a remote processor, and wherein the local processor performs steps (i) and (ii) and the remote processor performs steps (iii) and (iv).

In some non-limiting embodiments or aspects, the plurality of fingerprints received by the fingerprint reader may comprise at least one first fingerprint from a first user and at least one second fingerprint from a second user, wherein the at least one account identifier comprises a first account identifier associated with the first user and a second account identifier associated with the second user, and wherein processing the transaction message comprises charging at least a portion of a transaction value from the transaction data to at least one account corresponding to the at least one first account identifier and charging at least a portion of the transaction value to at least one account corresponding to the at least one second account identifier.

In some non-limiting embodiments or aspects, the at least one account identifier may comprise a plurality of account identifiers, each account identifier assigned to a different fingerprint of the plurality of fingerprints, wherein the at least one processor is further programmed or configured to determine a preferred account identifier of the at least two account identifiers based at least partially on preference data, and wherein the at least one account identifier used to process the transaction request comprises the preferred account identifier.

In some non-limiting embodiments or aspects, the point-of-sale system may further comprise (e) a biometric input device configured to receive a secondary biometric input, the secondary biometric input comprising at least one of the following: a face, an iris, a retina, hand geometry, finger geometry, an ear shape, DNA, a gait, a signature, a voice, or any combination thereof, wherein the at least one processor is further programmed or configured to (v) authenticate the transaction message based at least partially on the secondary biometric input. In some non-limiting embodiments or aspects, the at least one transaction message may be generated by combining the transaction data and fingerprint data derived from the plurality of fingerprints.

According to some non-limiting embodiments or aspects provided is a computer-implemented method of processing biometric inputs, comprising: assigning, with at least one processor, a plurality of fingerprints of a user to a plurality of account identifiers associated with the user, such that each fingerprint of the plurality of fingerprints corresponds to an account identifier of the plurality of account identifiers; receiving, from a point-of-sale system, a transaction request comprising at least one biometric input and transaction data, the at least one biometric input comprising at least one fingerprint of the plurality of fingerprints; determining, with at least one processor, at least one account identifier of the plurality of account identifiers assigned to the at least one fingerprint; and processing the transaction request based at least partially on the at least one account identifier and the transaction data.

In some non-limiting embodiments or aspects, the at least one biometric input may comprise at least two fingerprints of the plurality of fingerprints, and the at least one account identifier may comprise at least two account identifiers of the plurality of account identifiers assigned to the at least two fingerprints, the method further comprising determining, with at least one processor, a preferred account identifier of the at least two account identifiers based at least partially on preference data, wherein the at least one account identifier used to process the transaction request comprises the preferred account identifier. In some non-limiting embodiments or aspects, the preference data may comprise at least one of the following: user-specified preference data, account balance data, account spending limit data, discount data, rewards data, or any combination thereof.

In some non-limiting embodiments or aspects, the method may further comprise assigning, with at least one processor, a second plurality of fingerprints of a second user to a plurality of second account identifiers associated with the second user, such that each fingerprint of the second plurality of fingerprints corresponds to an account identifier of the second plurality of account identifiers, wherein the at least one biometric input further comprises at least one second fingerprint of the second plurality of fingerprints, wherein the at least one account identifier comprises at least one first account identifier associated with the user and at least one second account identifier associated with the second user, and wherein processing the transaction request comprises charging at least a portion of a transaction value associated with the transaction request to at least one account corresponding to the at least one first account identifier and charging at least a portion of the transaction value to at least one account corresponding to the at least one second account identifier.

In some non-limiting embodiments or aspects, the method may further comprise: assigning, with at least one processor, at least one secondary biometric input of the user to the plurality of account identifiers associated with the user, the at least one biometric input further comprising the at least one secondary biometric input; and authenticating the transaction request based at least partially on the at least one secondary biometric. In some examples, the at least one secondary biometric input may comprise at least one of the following: a face, an iris, a retina, hand geometry, finger geometry, an ear shape, DNA, a gait, a signature, a voice, or any combination thereof.

In some non-limiting embodiments or aspects, the method may further comprise receiving the at least one biometric input from a fingerprint reader in communication with the point-of-sale system. In some examples, the fingerprint scanner may comprise at least one of the following: a separate fingerprint reader, a fingerprint reader integrated into a mobile device operated by the user, an optical fingerprint reader, a capacitive fingerprint reader, an ultrasound fingerprint reader, a thermal fingerprint reader, or any combination thereof. In some examples, the point-of-sale device may comprise at least one of the following: a physical merchant point-of-sale device, a mobile device operated by the user, or any combination thereof.

According to a some non-limiting embodiments or aspects, provided is a system for processing biometric inputs, comprising at least one server computer including at least one processor, the at least one server computer programmed or configured to: assign a plurality of fingerprints of a user to a plurality of account identifiers associated with the user, such that each fingerprint of the plurality of fingerprints corresponds to an account identifier of the plurality of account identifiers; receive a transaction request comprising at least one biometric input and transaction data, the at least one biometric input comprising at least one fingerprint of the plurality of fingerprints; determine at least one account identifier of the plurality of account identifiers assigned to the at least one fingerprint; and process the transaction request based at least partially on the at least one account identifier and the transaction data.

In some non-limiting embodiments or aspects, the system may further comprise a fingerprint reader in communication with a point-of-sale device, the fingerprint reader comprising at least one of the following: a separate fingerprint reader, a fingerprint reader integrated into a mobile device operated by the user, an optical fingerprint reader, a capacitive fingerprint reader, an ultrasound fingerprint reader, a thermal fingerprint reader, or any combination thereof.

In some non-limiting embodiments or aspects, the at least one biometric input may comprise at least two fingerprints of the plurality of fingerprints, wherein the at least one account identifier comprises at least two account identifiers of the plurality of account identifiers assigned to the at least two fingerprints, and wherein the at least one server computer is further programmed or configured to determine a preferred account identifier of the at least two account identifiers based at least partially on preference data, wherein the at least one account identifier used to process the transaction request comprises the preferred account identifier. In some examples, the preference data may comprise at least one of the following: user-specified preference data, account balance data, account spending limit data, discount data, rewards data, or any combination thereof.

In some non-limiting embodiments or aspects, the at least one server computer may be further programmed or configured to assign a second plurality of fingerprints of a second user to a plurality of second account identifiers associated with the second user, such that each fingerprint of the second plurality of fingerprints corresponds to an account identifier of the second plurality of account identifiers, wherein the at least one biometric input further comprises at least one second fingerprint of the second plurality of fingerprints, wherein the at least one account identifier comprises at least one first account identifier associated with the user and at least one second account identifier associated with the second user, and wherein processing the transaction request comprises charging at least a portion of a transaction value associated with the transaction request to at least one account corresponding to the at least one first account identifier and charging at least a portion of the transaction value to at least one account corresponding to the at least one second account identifier.

In some non-limiting embodiments or aspects, the at least one server computer may be further programmed or configured to: assign at least one secondary biometric input of the user to the plurality of account identifiers associated with the user, the at least one biometric input further comprising the at least one secondary biometric input; and authenticate the transaction request based at least partially on the at least one secondary biometric input. In some examples, the at least one secondary biometric input comprises at least one of the following: a face, an iris, a retina, hand geometry, finger geometry, an ear shape, DNA, a gait, a signature, a voice, or any combination thereof.

According to a some non-limiting embodiments or aspects provided is a computer-implemented method of processing biometric inputs, comprising: assigning, with at least one processor, at least one first fingerprint of a first user to at least one first account identifier corresponding to at least one account of the first user; assigning, with at least one processor, at least one second fingerprint of a second user to at least one second account identifier corresponding to at least one account of the second user; receiving, from a point-of-sale system, a transaction request comprising transaction data, the at least one first fingerprint, and the at least one second fingerprint, the transaction data comprising a transaction value; and apportioning, with at least one processor, the transaction value between the at least one account of the first user and the at least one account of the second user.

In some non-limiting embodiments or aspects, the method may further comprise assigning, with at least one processor, at least one third fingerprint of a third user to at least one third account identifier corresponding to at least one account of the third user, wherein the transaction request further comprises the at least one third fingerprint, and wherein the transaction value is apportioned between the at least one account of the first user, the at least one account of the second user, and the at least one account of the third user.

According to a some non-limiting embodiments or aspects provided is a system for processing biometric inputs, comprising at least one server computer including at least one processor, the at least one server computer programmed or configured to: assign at least one first fingerprint of a first user to at least one first account identifier corresponding to at least one account of the first user; assign at least one second fingerprint of a second user to at least one second account identifier corresponding to at least one account of the second user; receive, from a point-of-sale system, a transaction request comprising transaction data, the at least one first fingerprint, and the at least one second fingerprint, the transaction data comprising a transaction value; and apportion the transaction value between the at least one account of the first user and the at least one account of the second user.

In some non-limiting embodiments or aspects, the at least one server computer may be further programmed or configured to assign at least one third fingerprint of a third user to at least one third account identifier corresponding to at least one account of the third user, wherein the transaction request further comprises the at least one third fingerprint, and wherein the transaction value is apportioned between the at least one account of the first user, the at least one account of the second user, and the at least one account of the third user.

According to a some non-limiting embodiments or aspects provided is a point-of-sale system for use in processing transactions, comprising: at least one processor programmed or configured to: receive, by the at least one processor, information associated with at least one biometric attribute of a user, wherein the information is received based on scanning a body part of the user with a biometric reader device; receive, by the at least one processor, transaction data from an input device, wherein the transaction data is associated with a transaction that involves the user; generate, by the at least one processor, at least one transaction message based on the information associated with the at least one biometric attribute and the transaction data; communicate, by the at least one processor, the at least one transaction message to a server device; and receive, by the at least one processor, a response message after communicating the at least one transaction message, wherein the response message comprises information associated with confirming the transaction or rejecting the transaction.

According to a some non-limiting embodiments or aspects provided is a system for use in processing transactions, comprising: at least one processor programmed or configured to: receive, by the at least one processor, a transaction message, wherein the transaction message comprises information associated with at least one biometric attribute of a user and transaction data that is associated with a transaction that involves the user, wherein the information associated with the at least one biometric attribute of the user comprises information generated based on scanning a body part of the user with a biometric reader device; determine, by the at least one processor, at least one account identifier associated with an account of the user, wherein the at least one account identifier is determined based on the at least one biometric attribute included in the transaction message; process, by the at least one processor, the transaction based on the at least one account identifier and the transaction data; generate, by the at least one processor, a response message based on processing the transaction, wherein the response message comprises information associated with confirming the transaction or rejecting the transaction; and communicate, by the at least one processor, the response message to a point-of-sale device.

Further non-limiting embodiments or aspects are set forth in the following numbered clauses:

Clause 1: A point-of-sale system for processing biometric inputs, comprising: (a) a fingerprint reader configured to receive a plurality of fingerprints simultaneously or substantially simultaneously; (b) an input device configured to receive transaction data, the transaction data comprising a transaction value; (c) a communication device; and (d) at least one processor in communication with the fingerprint reader, the input device, and the communication device, the at least one processor programmed or configured to: (i) generate at least one transaction message for a transaction based at least partially on a plurality of account identifiers corresponding to the plurality of fingerprints received by the fingerprint reader and the transaction data received by the input device, the at least one transaction message comprising an apportionment of the transaction value among the plurality of account identifiers; and (ii) communicate, with the communication device, the at least one transaction message to a transaction processing server.

Clause 2: The point-of-sale system of clause 1, wherein the fingerprint reader comprises at least one of the following: an optical fingerprint reader, a capacitive fingerprint reader, an ultrasound fingerprint reader, a thermal fingerprint reader, or any combination thereof.

Clause 3: The point-of-sale system of clause 1 or 2, wherein the at least one processor is further programmed or configured to: (iii) determine at least one account identifier of a plurality of account identifiers assigned to the at least one fingerprint; and (iv) process the transaction message based at least partially on the at least one account identifier and the transaction data.

Clause 4: The point-of-sale system of clause 3, wherein the at least one processor comprises a local processor and a remote processor, and wherein the local processor performs steps (i) and (ii) and the remote processor performs steps (iii) and (iv).

Clause 5: The point-of-sale system of clause 3 or 4, wherein the plurality of fingerprints received by the fingerprint reader comprises at least one first fingerprint from a first user and at least one second fingerprint from a second user, wherein the at least one account identifier comprises a first account identifier associated with the first user and a second account identifier associated with the second user, and wherein processing the transaction message comprises charging at least a portion of a transaction value from the transaction data to at least one account corresponding to the at least one first account identifier and charging at least a portion of the transaction value to at least one account corresponding to the at least one second account identifier.

Clause 6: The point-of-sale system of any of clauses 3-5, wherein the at least one account identifier comprises a plurality of account identifiers, each account identifier assigned to a different fingerprint of the plurality of fingerprints, wherein the at least one processor is further programmed or configured to determine a preferred account identifier of the at least two account identifiers based at least partially on preference data, and wherein the at least one account identifier used to process the transaction request comprises the preferred account identifier.

Clause 7: The point-of-sale system of any of clauses 1-6, further comprising: (e) a biometric input device configured to receive a secondary biometric input, the secondary biometric input comprising at least one of the following: a face, an iris, a retina, hand geometry, finger geometry, an ear shape, DNA, a gait, a signature, a voice, or any combination thereof, wherein the at least one processor is further programmed or configured to (v) authenticate the transaction message based at least partially on the secondary biometric input.

Clause 8: The point-of-sale system of any of clauses 1-7, wherein the at least one transaction message is generated by combining the transaction data and fingerprint data derived from the plurality of fingerprints.

Clause 9: A computer-implemented method of processing biometric inputs, comprising: assigning, with at least one processor, a plurality of fingerprints of a user to a plurality of account identifiers associated with the user, such that each fingerprint of the plurality of fingerprints corresponds to an account identifier of the plurality of account identifiers; receiving, from a point-of-sale system, a transaction request comprising at least one biometric input and transaction data, the at least one biometric input comprising at least one fingerprint of the plurality of fingerprints; determining, with at least one processor, at least one account identifier of the plurality of account identifiers assigned to the at least one fingerprint; and processing the transaction request based at least partially on the at least one account identifier and the transaction data.

Clause 10: The computer-implemented method of clause 9, wherein the at least one biometric input comprises at least two fingerprints of the plurality of fingerprints, and wherein the at least one account identifier comprises at least two account identifiers of the plurality of account identifiers assigned to the at least two fingerprints, the method further comprising determining, with at least one processor, a preferred account identifier of the at least two account identifiers based at least partially on preference data, wherein the at least one account identifier used to process the transaction request comprises the preferred account identifier.

Clause 11: The computer-implemented method of clause 9 or 10, wherein the preference data comprises at least one of the following: user-specified preference data, account balance data, account spending limit data, discount data, rewards data, or any combination thereof.

Clause 12: The computer-implemented method of any of clauses 9-11, further comprising assigning, with at least one processor, a second plurality of fingerprints of a second user to a plurality of second account identifiers associated with the second user, such that each fingerprint of the second plurality of fingerprints corresponds to an account identifier of the second plurality of account identifiers, wherein the at least one biometric input further comprises at least one second fingerprint of the second plurality of fingerprints, wherein the at least one account identifier comprises at least one first account identifier associated with the user and at least one second account identifier associated with the second user, and wherein processing the transaction request comprises charging at least a portion of a transaction value associated with the transaction request to at least one account corresponding to the at least one first account identifier and charging at least a portion of the transaction value to at least one account corresponding to the at least one second account identifier.

Clause 13: The computer-implemented method of any of clauses 9-12, further comprising: assigning, with at least one processor, at least one secondary biometric input of the user to the plurality of account identifiers associated with the user, the at least one biometric input further comprising the at least one secondary biometric input; and authenticating the transaction request based at least partially on the at least one secondary biometric input.

Clause 14: The computer-implemented method of clause 13, wherein the at least one secondary biometric input comprises at least one of the following: a face, an iris, a retina, hand geometry, finger geometry, an ear shape, DNA, a gait, a signature, a voice, or any combination thereof.

Clause 15: The computer-implemented method of any of clauses 9-14, further comprising receiving the at least one biometric input from a fingerprint reader in communication with the point-of-sale system.

Clause 16: The computer-implemented method of any of clauses 9-15, wherein the fingerprint scanner comprises at least one of the following: a separate fingerprint reader, a fingerprint reader integrated into a mobile device operated by the user, an optical fingerprint reader, a capacitive fingerprint reader, an ultrasound fingerprint reader, a thermal fingerprint reader, or any combination thereof.

Clause 17: The computer-implemented method of any of clauses 9-16, wherein the point-of-sale device comprises at least one of the following: a physical merchant point-of-sale device, a mobile device operated by the user, or any combination thereof.

Clause 18: A system for processing biometric inputs, comprising at least one server computer including at least one processor, the at least one server computer programmed or configured to: assign a plurality of fingerprints of a user to a plurality of account identifiers associated with the user, such that each fingerprint of the plurality of fingerprints corresponds to an account identifier of the plurality of account identifiers; receive a transaction request comprising at least one biometric input and transaction data, the at least one biometric input comprising at least one fingerprint of the plurality of fingerprints; determine at least one account identifier of the plurality of account identifiers assigned to the at least one fingerprint; and process the transaction request based at least partially on the at least one account identifier and the transaction data.

Clause 19: The system of clause 18, further comprising a fingerprint reader in communication with a point-of-sale device, the fingerprint reader comprising at least one of the following: a separate fingerprint reader, a fingerprint reader integrated into a mobile device operated by the user, an optical fingerprint reader, a capacitive fingerprint reader, an ultrasound fingerprint reader, a thermal fingerprint reader, or any combination thereof.

Clause 20: The system of clause 18 or 19, wherein the at least one biometric input comprises at least two fingerprints of the plurality of fingerprints, wherein the at least one account identifier comprises at least two account identifiers of the plurality of account identifiers assigned to the at least two fingerprints, and wherein the at least one server computer is further programmed or configured to determine a preferred account identifier of the at least two account identifiers based at least partially on preference data, wherein the at least one account identifier used to process the transaction request comprises the preferred account identifier.

Clause 21: The system of clause 20, wherein the preference data comprises at least one of the following: user-specified preference data, account balance data, account spending limit data, discount data, rewards data, or any combination thereof.

Clause 22: The system of any of clauses 18-21, wherein the at least one server computer is further programmed or configured to assign a second plurality of fingerprints of a second user to a plurality of second account identifiers associated with the second user, such that each fingerprint of the second plurality of fingerprints corresponds to an account identifier of the second plurality of account identifiers, wherein the at least one biometric input further comprises at least one second fingerprint of the second plurality of fingerprints, wherein the at least one account identifier comprises at least one first account identifier associated with the user and at least one second account identifier associated with the second user, and wherein processing the transaction request comprises charging at least a portion of a transaction value associated with the transaction request to at least one account corresponding to the at least one first account identifier and charging at least a portion of the transaction value to at least one account corresponding to the at least one second account identifier.

Clause 23: The system of any of clauses 18-22, wherein the at least one server computer is further programmed or configured to: assign at least one secondary biometric input of the user to the plurality of account identifiers associated with the user, the at least one biometric input further comprising the at least one secondary biometric input; and authenticate the transaction request based at least partially on the at least one secondary biometric.

Clause 24: The system of clause 23, wherein the at least one secondary biometric input comprises at least one of the following: a face, an iris, a retina, hand geometry, finger geometry, an ear shape, DNA, a gait, a signature, a voice, or any combination thereof.

Clause 25: A computer-implemented method of processing biometric inputs, comprising: assigning, with at least one processor, at least one first fingerprint of a first user to at least one first account identifier corresponding to at least one account of the first user; assigning, with at least one processor, at least one second fingerprint of a second user to at least one second account identifier corresponding to at least one account of the second user; receiving, from a point-of-sale system, a transaction request comprising transaction data, the at least one first fingerprint, and the at least one second fingerprint, the transaction data comprising a transaction value; and apportioning, with at least one processor, the transaction value between the at least one account of the first user and the at least one account of the second user.

Clause 26: The computer-implemented method of clause 25, further comprising assigning, with at least one processor, at least one third fingerprint of a third user to at least one third account identifier corresponding to at least one account of the third user, wherein the transaction request further comprises the at least one third fingerprint, and wherein the transaction value is apportioned between the at least one account of the first user, the at least one account of the second user, and the at least one account of the third user.

Clause 27: A system for processing biometric inputs, comprising at least one server computer including at least one processor, the at least one server computer programmed or configured to: assign at least one first fingerprint of a first user to at least one first account identifier corresponding to at least one account of the first user; assign at least one second fingerprint of a second user to at least one second account identifier corresponding to at least one account of the second user; receive, from a point-of-sale system, a transaction request comprising transaction data, the at least one first fingerprint, and the at least one second fingerprint, the transaction data comprising a transaction value; and apportion the transaction value between the at least one account of the first user and the at least one account of the second user.

Clause 28: The system of clause 27, wherein the at least one server computer is further programmed or configured to assign at least one third fingerprint of a third user to at least one third account identifier corresponding to at least one account of the third user, wherein the transaction request further comprises the at least one third fingerprint, and wherein the transaction value is apportioned between the at least one account of the first user, the at least one account of the second user, and the at least one account of the third user.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DESCRIPTION OF THE INVENTION

Figure 1:
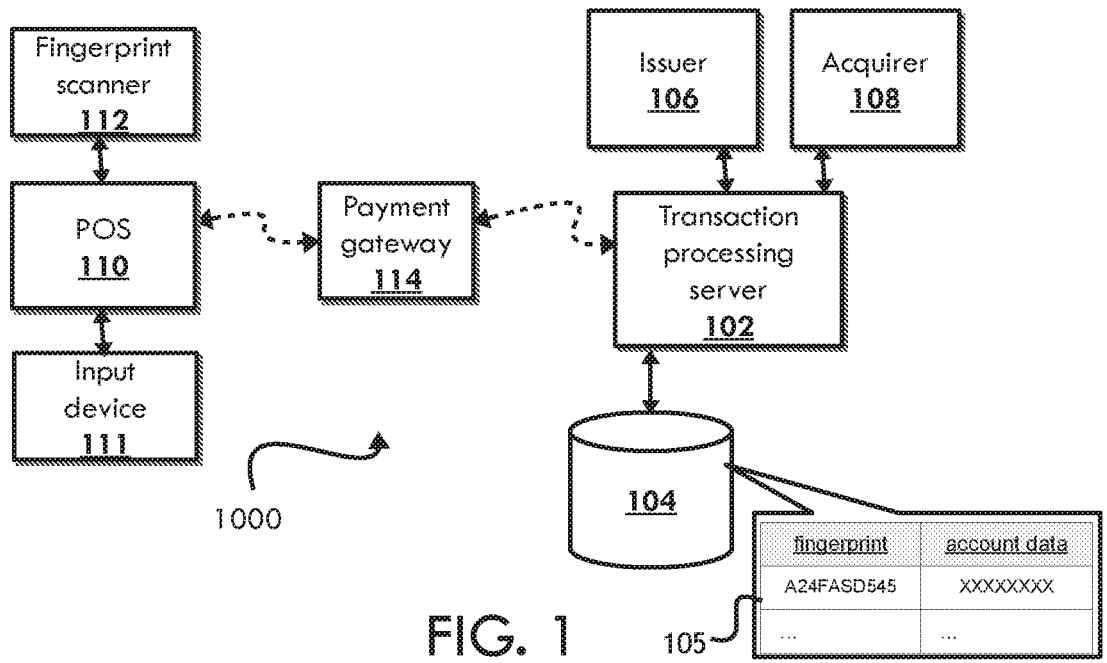
FIG. 1 is a schematic diagram of a system for processing biometric inputs according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt, transfer, and/or provision of one or more signals, messages, commands, or other type of data. For one unit (e.g., any device, system, or component thereof) to be in communication with another unit means that the one unit is able to directly or indirectly receive data from and/or provide data to (e.g., transmit, transfer, etc.) the other unit, including but not limited to the use of a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments of the present disclosure are directed to a system, method, and computer program product for processing biometric inputs. Multiple fingerprints are registered with account identifiers such that different fingerprints can be used to conduct transactions with different accounts. As an example, a user may register three different fingerprints to be associated with three different, corresponding account identifiers. In some examples, multiple fingerprints of one or multiple users may be scanned at a point-of-sale (POS) system during a transaction. The fingerprints are used to identify accounts associated with those users. One or more accounts for conducting the transaction may be determined based on the multiple accounts assigned to the multiple fingerprints. For example, a preferred account may be determined from a plurality of accounts. In some embodiments, a transaction value may be apportioned across multiple accounts of one or more users. Non-limiting embodiments of the present disclosure are also directed to a POS system including a fingerprint scanner configured to scan multiple fingerprints simultaneously or substantially simultaneously.

As used herein, the term "transaction service provider" may refer to an entity that receives transaction authorization requests from merchants or other entities and provides guarantees of payment, in some cases through an agreement between the transaction service provider and an issuing institution. The term "transaction service provider" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments.

As used herein, the term "account identifier" may include one or more PANs, tokens, or other identifiers associated with a customer account. The term "token" may refer to an identifier that is used as a substitute or replacement identifier for another account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different users or purposes. An issuer institution may be associated with a bank identification number (BIN) or other unique identifier that uniquely identifies it among other issuer institutions. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "acquirer institution" may refer to an entity licensed by the transaction service provider and approved by the transaction service provider to originate transactions using a portable financial device of the transaction service provider. The transactions may include original credit transactions (OCTs) and account funding transactions (AFTs). The acquirer institution may be authorized by the transaction service provider to originate transactions using a portable financial device of the transaction service provider. The acquirer institution may contract with a payment gateway to enable the facilitators to sponsor merchants. An acquirer institution may be a financial institution, such as a bank. The terms "acquirer institution," "acquirer bank," and "acquirer system" may also refer to one or more computer systems operated by or on behalf of an acquirer institution, such as a server computer executing one or more software applications.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices that are configured to communicate with one or more networks. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices.

As used herein, the term "electronic wallet" refers to one or more electronic devices and/or software applications that are configured to initiate and/or conduct payment transactions. An electronic wallet may include an electronic wallet application that is executed by a mobile device operated by a customer and may further include server-side software and databases for maintaining and providing transaction data to the mobile device. An "electronic wallet provider" may include an entity that provides and/or maintains an electronic wallet for a customer, such as Google Wallet™, Android Pay™, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The portable financial device may include volatile or non-volatile memory to store information, such as an account identifier or a name of the account holder.

As used herein, the term "payment gateway" may refer to a payment processing system operated by or on behalf of an entity that contracts with an acquirer institution to provide transaction service provider payment services to one or more merchants using portable financial devices managed by the transaction service provider.

Referring now to FIG. 1, a system 1000 for processing biometrics inputs is shown according to some non-limiting embodiments or aspects. A POS system 110 is in communication with a fingerprint scanner 112. The fingerprint scanner 112 may be separate from or integrated with the POS system 110. In some examples, the fingerprint scanner 112 may be part of another device, such as a mobile device, that is in communication with or takes the place of the POS system 110. The POS system 110 is also in communication with a payment gateway 114, which is in communication with a transaction processing server 102. It will be appreciated that the POS system 110 may also be in communication with the transaction processing server 102 without using a payment gateway 114 and that an acquirer system 108 may also be in communication with the payment gateway 114 and/or POS system 110 for facilitating a transaction. The POS system 110 may communicate with the payment gateway 114 and/or transaction processing server 102 through a public or private network. The transaction processing server 102 is in communication with a data storage device 104 which may be local or remote to the transaction processing server 102. The data storage device 104 may include a biometric database 105 including fingerprint data corresponding to account data. The transaction processing server 102 is also in communication with an issuer system 106 and an acquirer system 108 for settling the transactions.

With continued reference to FIG. 1, the POS system 110 is in communication with an input device 111, such as but not limited to a barcode scanner, a card scanner, a wireless receiver or transceiver (e.g., NFC, Bluetooth®, RFID, and/or the like), a keyboard, a keypad, a mobile device, a microphone, and/or any combination thereof. The input device 111 receives transaction data such as, for example, a transaction value, a product (e.g., good or service) value, rewards account data, loyalty account data, and/or the like. The transaction data may be manually input and/or stored in a one- or two-dimensional barcode, transponder, magnetic strip, mobile device, and/or other like data storage device. To initiate a transaction, one or more users scan their fingerprints using the fingerprint scanner 112. The fingerprints may be scanned in series or, in other examples, simultaneously or substantially simultaneously using the fingerprint scanner 112. In response to scanning the fingerprints, the POS system 110 receives fingerprint data from the fingerprint scanner 112 and combines the fingerprint data with transaction data to generate a transaction message. The fingerprint data may include one or more images, strings of characters (e.g., binary or hexadecimal representations), and/or any other form of data. In some examples, the fingerprint data may be communicated in encrypted form for protection.

The transaction message may be generated based on one or more transaction parameters from the transaction data, such as the transaction amount, a transaction code, a merchant identifier (e.g., a unique merchant identifier, a merchant name, a merchant location, and/or the like) and other information concerning the transaction. The transaction message may include the transaction parameters as fields in the message and the captured fingerprint data may be included in the transaction message. In other examples, the transaction message may include two separate messages, one including the fingerprint data and the other including the transaction data. It will be appreciated that there are various other ways to organize the transaction data and fingerprint data for communication to a remote system or device.

Still referring to FIG. 1, the POS system 110 communicates the transaction message and/or fingerprint data to the payment gateway 114. The payment gateway 114, after identifying the appropriate transaction processing server 102, communicates the transaction message to the transaction processing server 102. As explained above, it will be appreciated that the transaction message may be also communicated directly to the transaction processing server 102 and/or an acquirer system 108 for initiating the transaction. The transaction message communicated to the transaction processing server 102 may be the same transaction message that was received from the POS system 110 or, in other examples, may be a modified or new transaction message based on the first transaction message. Once the transaction processing server 102 receives the fingerprint data, it then searches the biometric database 105 to match the fingerprint data with one or more account identifiers that have been registered. It will be appreciated that the biometric database 105 may be maintained and/or searched by any other entity or system. When one or more account identifiers are determined, the transaction processing server 102 determines which account identifiers to use to process the transaction and then authenticates and processes the transaction. For example, the transaction processing server 102 may settle the transaction with the issuer system 106 and acquirer system 108 and communicate a response message to the POS system 110 confirming or rejecting the transaction. It will be appreciated that, in further non-limiting examples, the fingerprint data may be processed at the POS system 110, rather than remotely, to determine one or more account identifiers associated with the fingerprints.

In some non-limiting embodiments or aspects, the transaction processing server 102, payment gateway 114, and/or POS system 110 may generate multiple transaction messages for a plurality of account identifiers. As an example, in embodiments in which a transaction value is apportioned among multiple accounts, a separate transaction message may be generated for each account. It will be appreciated that other variations are possible.

Figure 2:
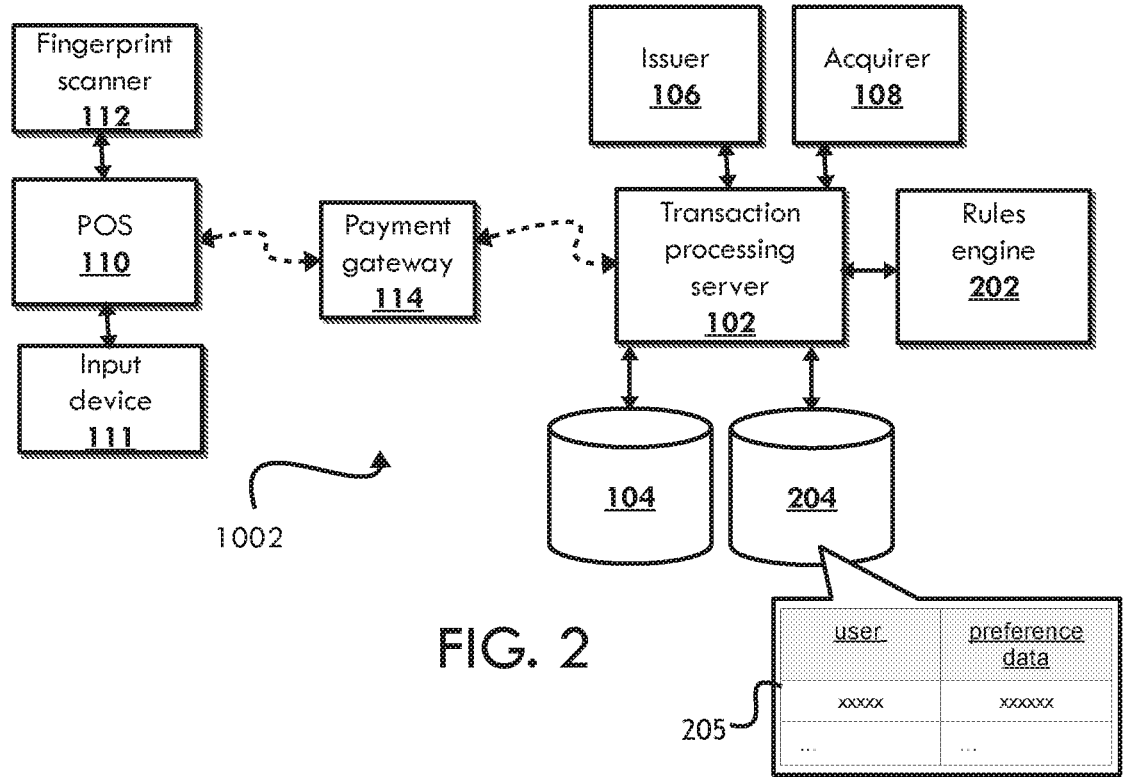
FIG. 2 is another schematic diagram of a system for processing biometric inputs according to some non-limiting embodiments or aspects.

Referring now to FIG. 2, a system 1002 for processing biometrics inputs is shown according to some non-limiting embodiments or aspects. The system 1002 includes the components shown and discussed in connection with FIG. 1 in addition to a rules engine 202 and a data storage device 204 comprising a preference database 205 in communication with the transaction processing server 102. The preference database 205 stores preference data which may include any type of data used to determine one or more preferred account identifiers from a plurality of account identifiers for a given transaction. For example, the preference data may include user-specified data, such as a ranking of account identifiers (or cards associated with account identifiers), reward preference, and/or spending ranges for the account identifiers (or cards associated with account identifiers), account balance data for accounts associated with the account identifiers, account spending limit data for accounts associated with the account identifiers, discount data for accounts associated with the account identifiers, rewards data for accounts associated with the account identifiers, and/or the like.

With continued reference to FIG. 2, the system 1002 includes a rules engine 202 in communication with the transaction processing server 102. The rules engine 202 may be one or more software applications and/or hardware components programmed or configured to determine which account identifier of a plurality of account identifiers to use for a given transaction based on the preference data stored in the preference database 204. For example, if a user scans two fingerprints using the fingerprint scanner 112, the transaction processing server 102 may access the biometric database 105 to match each of the two fingerprints to an account identifiers for that user. After determining the account identifiers associated with the fingerprints, the rules engine 202 may apply one or more rules to determine a preferred account identifier. The preference data may be in the form of one or more rules to be executed by the rules engine 202. For example, if the preference data includes a user-specified ranking of accounts and a credit or spending limit for each account, and the highest ranked account corresponding to a fingerprint does not have a sufficient credit or spending limit for the transaction value, the second-highest ranked account may be used or the transaction value may be split among the highest ranked and second-highest ranked accounts. In an example in which two or more fingerprints of a user are scanned, the rules engine 202 may determine which account identifier of the two or more account identifiers to use based on which account identifier has a higher cash back reward for that transaction. The rules engine 202 may process as inputs various transaction parameters such as, for example, a merchant category, a transaction value, rewards data stored in the preference database 204 or in a separate rewards or loyalty database, and/or user input provided through the input device 111, a mobile device, the POS system 110, or otherwise.

With continued reference to FIG. 2, the rules engine 202 may determine which account identifier of a plurality of account identifiers to use based on a spending limit or account balance provided in the preference database 204 or in a separate account database. For example, the rules engine 202 may determine to use a first account identifier for transactions having less than a predetermined transaction value and a second account identifier for transactions having more than a predetermined transaction value. In other examples, the rules engine 202 may determine to use an account identifier associated with an account having a spending limit or credit limit that accommodates (e.g., is greater than) the transaction value. In still further examples, the rules engine 202 may determine to apportion the transaction value across one or more accounts based on user input, spending or credit limits, and/or the like. In some examples, the transaction value may be apportioned across multiple accounts to maximize rewards. It will be appreciated that various other arrangements are possible.

Still referring to FIG. 2, the fingerprint scanner 112 may be used to scan one or more fingerprints of multiple users in series, simultaneously, or substantially simultaneously. For example, if two users wish to split a transaction among their respective accounts, each of those users may scan one or more fingerprints. If either user scanned more than one fingerprint, the rules engine 202 may determine a preferred account identifier for those user(s) as discussed herein. Once the transaction processing server 102 identifies one or more preferred account identifiers for each of the two users, the transaction value may be apportioned across those account identifiers. In some examples, the rules engine 202 may determine how to apportion the transaction value and, in other examples, the transaction value may be divided by the number of users and/or account identifiers (e.g., a 50% apportionment for two users). In some examples, one or more users may further apportion their respective share of the transaction value across two or more accounts.

Figure 3:
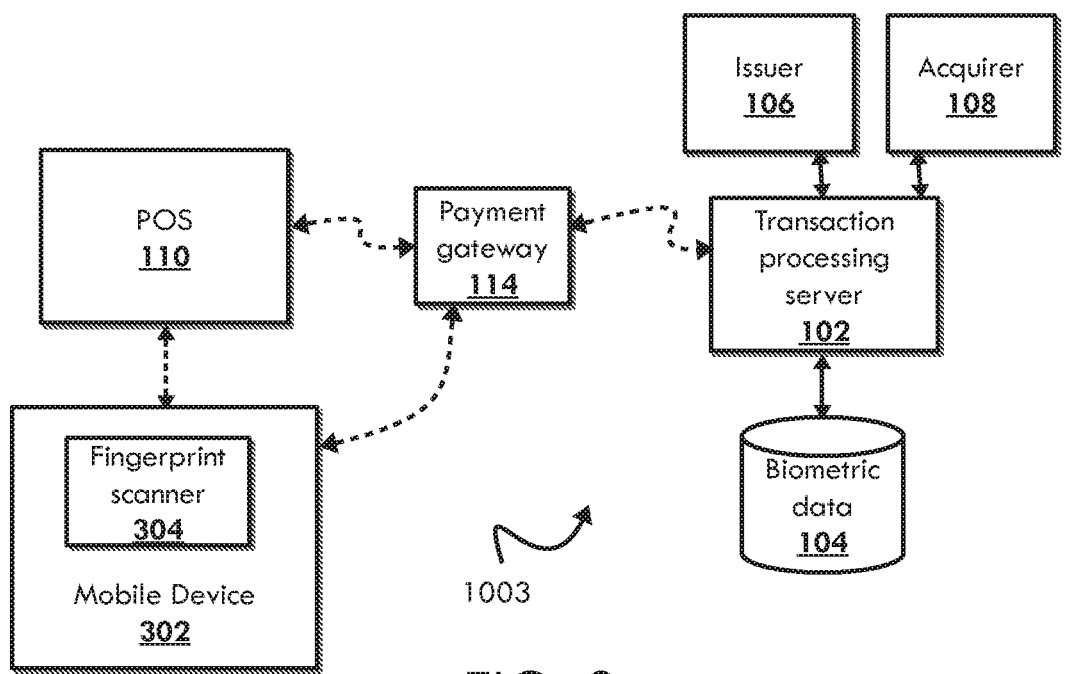
FIG. 3 is a further schematic diagram of a system for processing biometric inputs according to some non-limiting embodiments or aspects.

Referring now to FIG. 3, a system 1003 for processing biometrics inputs is shown according to some non-limiting embodiments or aspects. The system 1003 includes the components shown and discussed in connection with FIG. 1 in addition to a mobile device 302 in communication with the POS system 110 and/or payment gateway 114. The mobile device 302 includes or is in communication with a fingerprint scanner 304 and is used for initiating transactions with or without the POS system 110. As an example, the mobile device 302 may be a cellular phone including a housing with a built-in fingerprint scanner 304. The mobile device 302 may include an electronic wallet to initiate a transaction at a POS system 110, such as an NFC payment transaction or an online transaction (e.g., Visa Checkout®), in addition to providing fingerprint data. In other embodiments, the mobile device 302 may only be used to provide fingerprint data and the transaction may otherwise be initiated at the POS system 110. A user of the mobile device 302 scans one or more fingerprints on the mobile device 302 which are then communicated to the POS system 110 and used to generate a transaction message.

With continued reference to FIG. 3, in some non-limiting embodiments or aspects, the mobile device 302 may communicate with the payment gateway 114 and/or transaction processing server 102 to initiate the transaction. In such examples, the transaction message may be generated on the mobile device 302. In embodiments in which multiple users provide fingerprint data for apportioning the transaction value between them, one or multiple mobile devices 302 may be used to provide the fingerprint data. For example, each user may use their respective mobile devices to provide fingerprint data and/or approve of the transaction. In some non-limiting embodiments or aspects, one or multiple mobile devices 302 may receive transaction confirmation messages. As an example, in embodiments in which multiple users provide fingerprint data for apportioning the transaction value between them, mobile devices 302 for each of the multiple users may receive a transaction confirmation message including an apportioned transaction value, a total transaction value, and other like transaction data. It will be appreciated that various other messages and communications may be transmitted to one or more mobile devices 302 before, during, and after a transaction.

Figure 4:
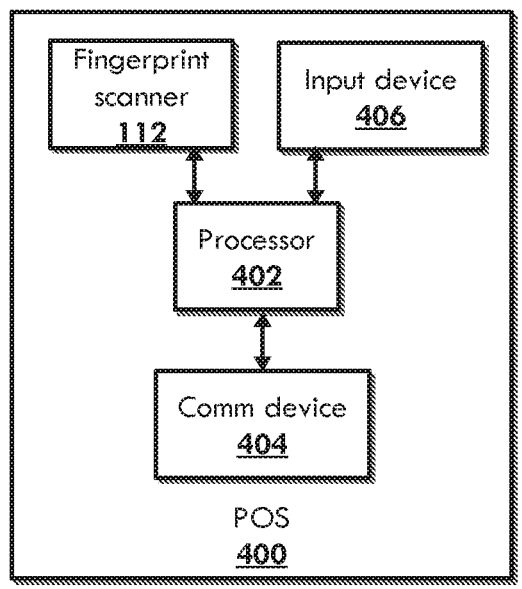
FIG. 4 is a schematic diagram of a point-of-sale system according to some non-limiting embodiments or aspects.

Referring now to FIG. 4, a POS system 400 is shown according to some non-limiting embodiments or aspects. The POS system 400 includes a processor 402, a fingerprint scanner 112, an input device 406, and a communication device 404. In some examples, the POS system may include a housing that includes the processor 402. The fingerprint scanner 112, input device 406, and communication device 404 may be internal or external to the housing. The input device 406 may include a barcode scanner, a card scanner, a wireless receiver or transceiver (e.g., NFC, Bluetooth, RFID, and/or the like), a keyboard, a keypad, a mobile device, a microphone, and/or any other input device capable of receiving transaction data such as, for example, a transaction value, a product (e.g., good or service) value, rewards account data, loyalty account data, and/or the like. The communication device 404 may include a network adapter, a modem, and/or any other like system or device for communicating a transaction message to a payment gateway and/or transaction processing server. The fingerprint scanner 112 may be configured to scan multiple fingerprints simultaneously or substantially simultaneously. The fingerprint scanner 112 may also have a surface large enough to accommodate multiple fingers.

Figure 5:
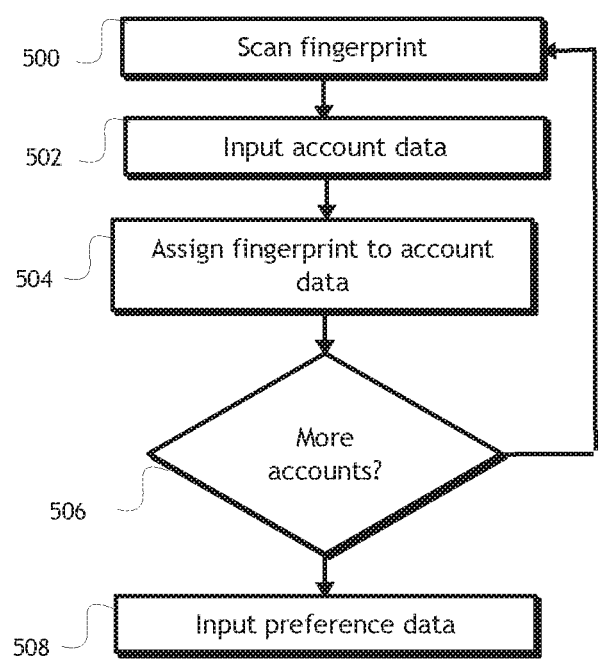
FIG. 5 is a flow diagram of a method for registering one or more fingerprints according to some non-limiting embodiments or aspects.

Referring now to FIG. 5, a flow chart is shown for a method of registering biometrics according to some non-limiting embodiments or aspects. A user may participate in a registration process in which the user's fingerprints are scanned and the user's account information is input. One or more graphical user interfaces may be provided to allow a user to assign different fingerprints with different accounts, edit account information, change fingerprint assignments, input preference data, and create rules. At a first step 500, a user scans a fingerprint. The user may scan a fingerprint for registration at a POS system, on a mobile device, and/or on any fingerprint scanner in communication with a processor. At a next step 502, the user or some other entity inputs account data to be associated with that fingerprint. As an example, a user may swipe a payment card at a terminal, manually input an account identifier, and/or the like. The user may be prompted to input account data through one or more databases. At step 504, the fingerprint is assigned to the input account data and stored in a biometric database. It will be appreciated that the fingerprint may also be associated with the account data in any other database, such as an account database.

With continued reference to FIG. 5, at step 506, it is determined whether the user wishes to input additional accounts to assign to different fingerprints. As an example, a graphical user interface may prompt the user to end the registration process or to add an additional fingerprint and/or account. If there are more accounts to assign, the method returns to step 500 to repeat the flow of steps 500-506 for each fingerprint. If, at step 506, it is determined that there are no more accounts to assign, the method may proceed to step 508 where the user inputs preference data. The preference data may be input through a graphical user interface using an input device and/or one or more selectable options. Selectable options may include, for example, one or more drop-down menus, hyperlinks, buttons checkboxes, radio buttons, text input boxes, and/or the like. In some examples, the registration process may be carried out on a combination of devices and systems.

Figure 6:
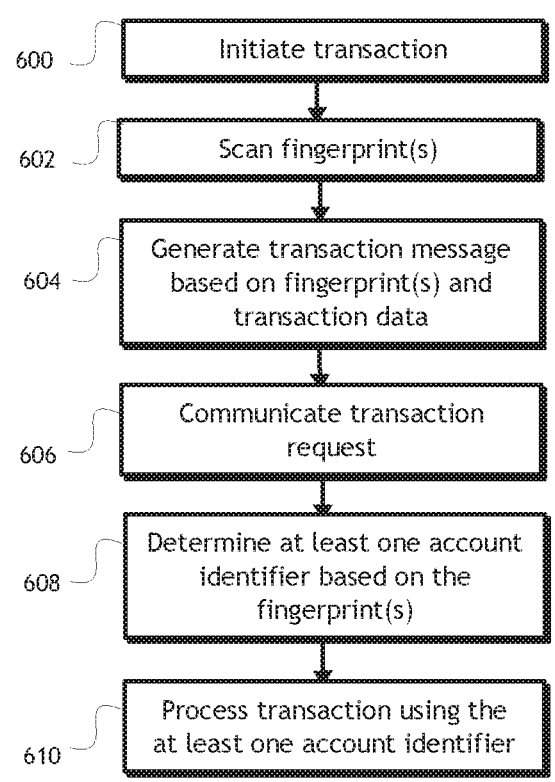
FIG. 6 is a flow diagram of a method for processing biometric inputs according to some non-limiting embodiments or aspects.

Referring now to FIG. 6, a flow chart is shown for a method of processing biometrics inputs according to some non-limiting embodiments or aspects. At a first step 600, a transaction is initiated at a POS system and/or on a mobile device. The transaction may be initiated by inputting transaction data into a POS system and/or a mobile device. At a next step 602, one or more fingerprints are scanned using a fingerprint scanner. At step 604, a transaction message is generated based on the fingerprint data and transaction data concerning the transaction being initiated. At step 606, the transaction message is communicated to a transaction processing server or some other remote system. At step 608, the transaction processing server and/or other remote system determines at least one account identifier corresponding to the fingerprint data by matching the fingerprint data to other fingerprint data stored in a database and associated with account identifiers. At step 610, the transaction is processed using the one or more account identifiers determined in step 608.

In some non-limiting embodiments or aspects, the fingerprint data may additionally be used to authenticate a user. For example, a transaction processing server, mobile device, and/or POS system may authenticate the user based on the fingerprint data. The authentication may occur before, during, or after identifying a corresponding and/or preferred account identifier. Moreover, the user may be authenticated using the same biometric database used to identify corresponding account identifiers or, in other examples, may be authenticated with one or more separate and/or third-party systems.

Figure 7:
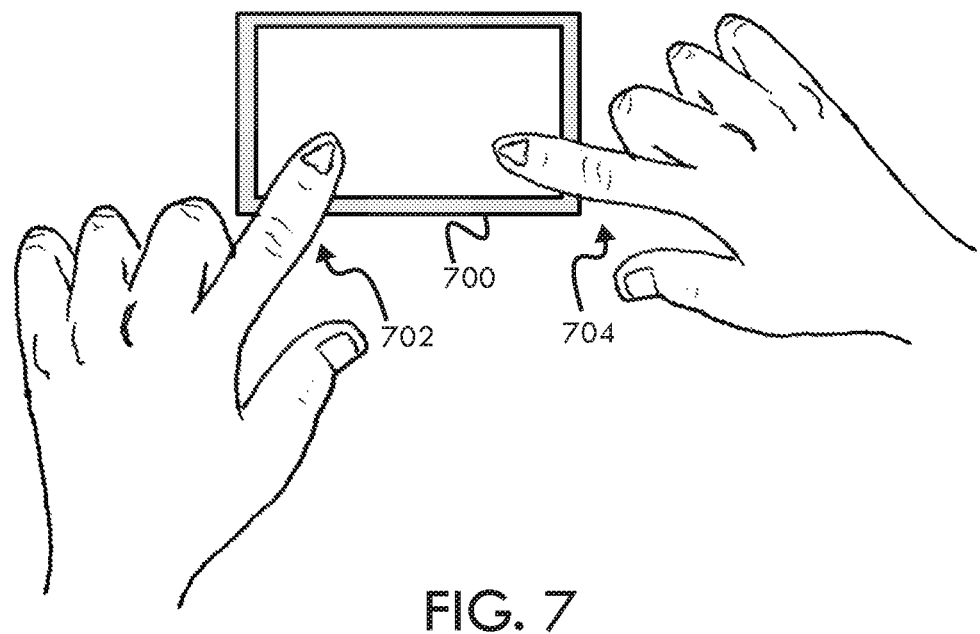
FIG. 7 is a fingerprint scanner according to some non-limiting embodiments or aspects.

Referring to FIG. 7, a fingerprint scanner 700 is shown according to some non-limiting embodiments or aspects. In the illustrated example, a first finger 702 of a first user and a second finger 704 of a second user are placed on the fingerprint scanner 700. It will be appreciated that, in other some non-limiting embodiments or aspects, a single user may have registered fingerprints of two fingers 702, 704 on two different hands. As described herein, the fingerprint scanner may scan both the first finger 702 and second finger 704 simultaneously or substantially simultaneously. In other embodiments, the fingers 702, 704 may be scanned in series. The fingerprint scanner 700 then communicates the fingerprint data to a POS system, server, or other system for processing. The transaction value may then be apportioned among accounts respectively associated with the first and second users. As described herein, the transaction value may be apportioned in various ways. It will be appreciated that the fingerprint scanner 700 may be any shape and/or size to accommodate any number of fingers. In some embodiments, each user may use separate fingerprint scanners 700. Further, in some examples, multiple users may each scan multiple fingers such that their apportioned share of the transaction value is charged to a preferred account or apportioned further between multiple accounts for that user.

Figure 8:
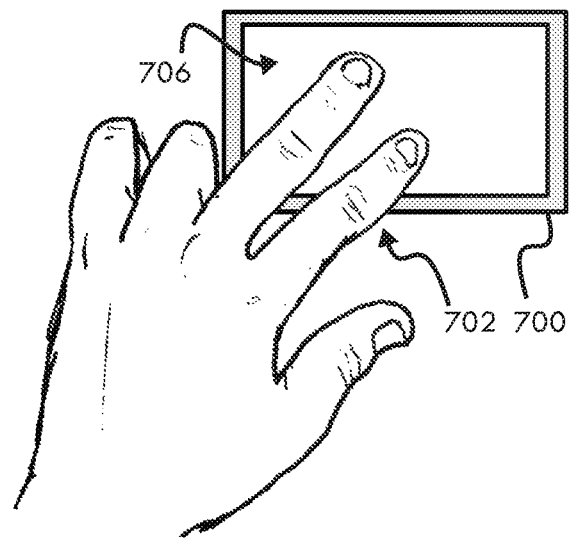
FIG. 8 is a fingerprint scanner according to another non-limiting embodiment.

Referring to FIG. 8, a fingerprint scanner 700 is shown according to some non-limiting embodiments or aspects. In the illustrated example, a first finger 702 and second finger 706 of a user are placed on the fingerprint scanner. A fingerprint of the first finger 702 may be associated with a first account for the user and a fingerprint of the second finger 706 may be associated with a second account for the user. The fingerprint scanner 700 may scan both the first finger 702 and second finger 706 simultaneously or substantially simultaneously. In other embodiments, the fingers 702, 706 may be scanned in series. The fingerprint scanner 700 then communicates the fingerprint data to a POS system, server, or other system for processing. As described herein, the fingerprint data may be processed to identify the first and second accounts and, based on the first and second accounts, used to determine which account is preferred for the transaction. The fingerprint data may also be processed to apportion the transaction value across the first and second accounts. Although the example illustrated in FIG. 8 includes two fingers 702, 706, any number of fingers may be scanned by the fingerprint scanner. Further, it will be appreciated that the fingerprint scanner 700 may be any shape and/or size to accommodate any number of fingers. In further embodiments, separate fingerprint scanners may be used for each finger 702, 706.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A point-of-sale system for processing biometric inputs, comprising:
    (a) a fingerprint reader;
    (b) an input device configured to receive transaction data for a transaction, the transaction data comprising a transaction value;
    (c) a communication device in communication with an electronic payment processing network;
    (d) at least one processor in communication with the fingerprint reader, the input device, and the communication device; and
    (e) at least one memory in communication with the at least one processor and including instructions that cause the at least one processor to:
        receive, from the fingerprint reader, a plurality of fingerprints simultaneously or substantially simultaneously;
        determine a plurality of account identifiers comprising a first account identifier assigned to a first fingerprint of the plurality of fingerprints and a second account identifier assigned to a second fingerprint of the plurality of fingerprints;
        apportion the transaction value among at least the first account identifier and the second account identifier of the plurality of account identifiers, resulting in a first apportioned transaction value and a second apportioned transaction value;
        generate a first transaction message for the transaction based at least partially on the first account identifier, the first apportioned transaction value, and the transaction data received by the input device;
        generate a second transaction message for the transaction based at least partially on the second account identifier, the second apportioned transaction value, and the transaction data received by the input device; and
        communicate, with the communication device, the first transaction message and the second transaction message to a transaction processing server in the electronic payment processing network.

2. The point-of-sale system of claim 1, wherein the at least one processor is further programmed or configured to:
    process the at least one transaction message based at least partially on the first account identifier, the second account identifier, and the transaction data.

3. The point-of-sale system of claim 2, wherein the at least one processor comprises a local processor and a remote processor, and wherein the local processor generates the first transaction message and second transaction message, and the remote processor processes the at least one transaction message.

4. The point-of-sale system of claim 1, wherein the plurality of fingerprints received by the fingerprint reader comprises the first fingerprint from a first user and the second fingerprint from a second user.

5. The point-of-sale system of claim 2, wherein each of the first account identifier and the second account identifier is assigned to a different fingerprint of the plurality of fingerprints, wherein the at least one processor is further programmed or configured to determine a preferred account identifier of the first account identifier and the second account identifier based at least partially on preference data, and wherein an account identifier used to process the first transaction message or the second transaction message comprises the preferred account identifier.

6. The point-of-sale system of claim 1, further comprising:
    a biometric input device configured to receive a secondary biometric input, the secondary biometric input comprising at least one of the following: a face, an iris, a retina, hand geometry, finger geometry, an ear shape, DNA, a gait, a signature, a voice, or any combination thereof,
    wherein the at least one processor is further programmed or configured to authenticate the first transaction message based at least partially on the secondary biometric input.

7. The point-of-sale system of claim 1, wherein the first transaction message is generated by combining the transaction data and fingerprint data derived from the plurality of fingerprints.

8. A computer-implemented method of processing biometric inputs, comprising:
assigning, with at least one processor, a plurality of fingerprints of a user to a plurality of account identifiers associated with the user, such that each fingerprint of the plurality of fingerprints corresponds to an account identifier of the plurality of account identifiers;
receiving, from a point-of-sale system, a transaction request comprising at least one biometric input and transaction data, the transaction data comprising a transaction value, the at least one biometric input comprising a first fingerprint of the plurality of fingerprints and a second fingerprint of the plurality of fingerprints;
determining, with at least one processor, a first account identifier assigned to the first fingerprint of the plurality of fingerprints and a second account identifier assigned to the second fingerprint of the plurality of fingerprints;
apportioning the transaction value among at least the first account identifier and the second account identifier of the plurality of account identifiers, resulting in a first apportioned transaction value and a second apportioned transaction value; and
processing the transaction request based at least partially on the first account identifier, the second account identifier, the first apportioned transaction value, and the second apportioned transaction value.

9. The computer-implemented method of claim 8, further comprising determining, with at least one processor, a preferred account identifier of at least the first account identifier and the second account identifier based at least partially on preference data, wherein at least one account identifier of the first account identifier and the second account identifier is used to process the transaction request and comprises the preferred account identifier.

10. The computer-implemented method of claim 8, further comprising assigning, with at least one processor, a second plurality of fingerprints of a second user to a plurality of second account identifiers associated with the second user, such that each fingerprint of the second plurality of fingerprints corresponds to an account identifier of the second plurality of account identifiers,
wherein the at least one biometric input further comprises at least one second fingerprint of the second plurality of fingerprints,
wherein the first account identifier is associated with the user and the second account identifier is associated with the second user, and
wherein processing the transaction request comprises charging the first apportioned transaction value to at least one account corresponding to the first account identifier and charging the first apportioned transaction value to at least one account corresponding to the second account identifier.

11. The computer-implemented method of claim 8, further comprising:
assigning, with at least one processor, at least one secondary biometric input of the user to the plurality of account identifiers associated with the user, the at least one biometric input further comprising the at least one secondary biometric input; and
authenticating the transaction request based at least partially on the at least one secondary biometric.

12. The computer-implemented method of claim 8, further comprising receiving the at least one biometric input from a fingerprint reader in communication with the point-of-sale system.

13. The computer-implemented method of claim 12, wherein the fingerprint reader comprises at least one of the following: a separate fingerprint reader, a fingerprint reader integrated into a mobile device operated by the user, an optical fingerprint reader, a capacitive fingerprint reader, an ultrasound fingerprint reader, a thermal fingerprint reader, or any combination thereof.

14. The computer-implemented method of claim 8, wherein the point-of-sale system comprises at least one of the following: a physical merchant point-of-sale device, a mobile device operated by the user, or any combination thereof.

15. A system for processing biometric inputs, comprising:
a fingerprint reader; and
at least one server computer including at least one processor, the at least one server computer programmed or configured to:
receive, from the fingerprint reader or a merchant system in communication with the fingerprint reader, a plurality of fingerprints simultaneously or substantially simultaneously;
assign a plurality of fingerprints of a user to a plurality of account identifiers associated with the user, such that each fingerprint of the plurality of fingerprints corresponds to an account identifier of the plurality of account identifiers;
receive a transaction request comprising at least one biometric input and transaction data, the transaction data comprising a transaction value, the at least one biometric input comprising a first fingerprint of the plurality of fingerprints and a second fingerprint of the plurality of fingerprints read with the fingerprint reader;
determine a first account identifier assigned to the first fingerprint of the plurality of fingerprints and a second account identifier assigned to the second fingerprint of the plurality of fingerprints;
apportion the transaction value among at least the first account identifier and the second account identifier of the plurality of account identifiers, resulting in a first apportioned transaction value and a second apportioned transaction value; and
process the transaction request based at least partially on the first account identifier, the second account identifier, the first apportioned transaction value, and the second apportioned transaction value.

16. The system of claim 15, further comprising a fingerprint reader in communication with a point-of-sale device, the fingerprint reader comprising at least one of the following: a separate fingerprint reader, a fingerprint reader integrated into a mobile device operated by the user, an optical fingerprint reader, a capacitive fingerprint reader, an ultrasound fingerprint reader, a thermal fingerprint reader, or any combination thereof.

17. The system of claim 15, wherein the at least one server computer is further programmed or configured to determine a preferred account identifier of at least the first account identifier and the second account identifier, and wherein an account identifier used to process the transaction request comprises the preferred account identifier.

18. The system of claim 15, wherein the at least one server computer is further programmed or configured to assign a second plurality of fingerprints of a second user to a plurality of second account identifiers associated with the second user, such that each fingerprint of the second plurality of fingerprints corresponds to an account identifier of the second plurality of account identifiers,
   wherein the at least one biometric input further comprises at least one second fingerprint of the second plurality of fingerprints,
   wherein the first account identifier is associated with the user and the second account identifier is associated with the second user, and
   wherein processing the transaction request comprises charging the first apportioned transaction value to at least one account corresponding to the first account identifier and charging the second apportioned transaction value to at least one account corresponding to the second account identifier.

19. The system of claim 15, wherein the at least one server computer is further programmed or configured to:
   assign at least one secondary biometric input of the user to the plurality of account identifiers associated with the user, the at least one biometric input further comprising the at least one secondary biometric input; and
   authenticate the transaction request based at least partially on the at least one secondary biometric.

20. The system of claim 19, wherein the at least one secondary biometric input comprises at least one of the following: a face, an iris, a retina, hand geometry, finger geometry, an ear shape, DNA, a gait, a signature, a voice, or any combination thereof.

* * * * *